(12) United States Patent
Mihara

(10) Patent No.: US 6,843,566 B2
(45) Date of Patent: Jan. 18, 2005

(54) LIGHTING DEVICE AND PROJECTION TYPE DISPLAY APPARATUS USING THE SAME

(75) Inventor: Hisayuki Mihara, Kodama-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/374,513

(22) Filed: Feb. 27, 2003

(65) Prior Publication Data

US 2003/0179346 A1 Sep. 25, 2003

(30) Foreign Application Priority Data

Feb. 28, 2002 (JP) ......................................... 2002-054846

(51) Int. Cl.⁷ ...................... G03B 21/26; G03B 21/00; G03B 21/20
(52) U.S. Cl. ............... 353/29; 353/33; 353/85
(58) Field of Search .............................. 353/20, 30–34, 353/37, 81, 85–87, 94, 122, 29, 50, 51; 349/7–10; 348/750, 751, 770, 771

(56) References Cited

U.S. PATENT DOCUMENTS

| | | | | |
|---|---|---|---|---|
| 5,526,063 A | | 6/1996 | Joubert et al. | |
| 6,252,636 B1 | * | 6/2001 | Bartlett | 348/743 |
| 6,362,573 B1 | * | 3/2002 | Helbing et al. | 315/155 |
| 6,517,211 B2 | * | 2/2003 | Mihara | 353/98 |
| 6,561,654 B2 | * | 5/2003 | Mukawa et al. | 353/31 |
| 2002/0067468 A1 | | 6/2002 | O'Connor | |
| 2002/0145708 A1 | * | 10/2002 | Childers et al. | 353/85 |
| 2002/0186349 A1 | * | 12/2002 | Wichner et al. | 353/29 |
| 2002/0186350 A1 | * | 12/2002 | Peterson | 353/29 |

FOREIGN PATENT DOCUMENTS

| | | |
|---|---|---|
| JP | 6-511328 | 12/1994 |
| JP | 7-98479 | 4/1995 |
| JP | 2000-155545 | 6/2000 |
| JP | 2000-305040 | 11/2000 |
| JP | 2002-296680 | 10/2002 |

* cited by examiner

*Primary Examiner*—David Gray
*Assistant Examiner*—Andrew Sever
(74) *Attorney, Agent, or Firm*—Pillsbury Winthrop LLP

(57) ABSTRACT

A light device has a plurality of light sources, and laser beam sources are arranged near a discharge bulb so that the laser beam can be overlapped with illuminating light from the discharge bulb. By doing so, the illuminating light is irradiated as overlapped illuminating light reinforcing red component, so that color rendering and luminance can be improved.

2 Claims, 10 Drawing Sheets

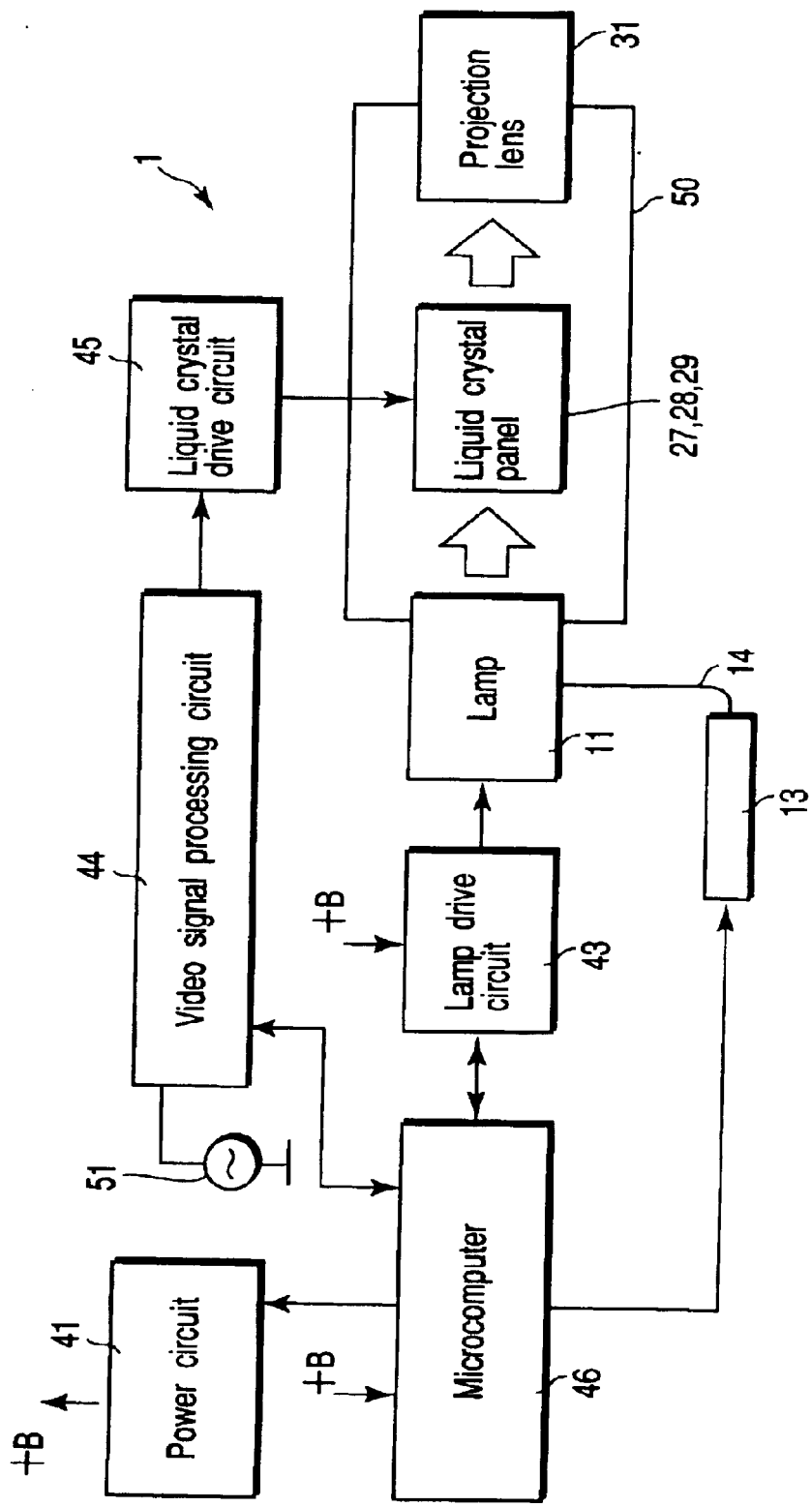
F I G. 3

LIGHTING DEVICE AND PROJECTION TYPE DISPLAY APPARATUS USING THE SAME

CROSS-REFERENCE TO RELATED APPLICATIONS

This application is based upon and claims the benefit of priority from the prior Japanese Patent Application No. 2002-054846, filed Feb. 28, 2002, the entire contents of which are incorporated herein by reference.

BACKGROUND OF THE INVENTION

1. Field of the Invention

The present invention relates to a lighting device. In particular, the present invention relates to a lighting device using semiconductor light-emitting element such as laser beam source, and to a projection type display apparatus using the lighting device.

2. Description of the Related Art

Recently, the projection- (projector-) type display apparatus has come into wide use. However, with the development of high image quality resulting from high-vision, high-level color rendering is required as the image display apparatus. Short arc type discharge lamps such as mercury lamps, metal halide lamps and xenon lamps are mainly used as the light source for the projection type display apparatus.

In such discharge lamps, a reflecting mirror guides an optical path, and unnecessary light is removed using individual filters. A fly-eye lens divides irradiating light, and overlaps and averages it together with a condenser lens, such that the discharge lamp irradiates a light valve with approximately uniform quality. Thereafter, the irradiating light guided by a dichroic mirror is transmitted by the light valve, and synthesized as projection light by complex prism so that image can be displayed on a screen.

However, the above-noted light source is a continuous spectrum light source having a steep peak. For this reason, in many projection type display devices, it is difficult to provide color rendering, that is, provide both monochromatic RGB purity and the total luminance flux after optical synthesis. In order to give priority to color rendering, only a slight region, equivalent to RGB wavelength, in the emission spectrum of the discharge lamp should be used as effective light. As a result, the total output luminance flux after synthesis becomes small.

On the other hand, in order to give priority to output luminance flux value, RGB selection light should be expanded to the maximum range having no intersection. As a result, not only the chromatic purity of each color deteriorates, but also chromatic phenomenon is confirmed in white uniformity after synthesis; therefore, color rendering is lost. The removed unnecessary light has the possibility of causing the problem as heating or stray light.

The above problem results from the discharge lamp having continuous and steep spectrum distribution. A projection type display device using semiconductor light sources such as light emitting diodes and laser diodes, have been developed as a new source for solving the above problem. For example, Jpn. Pat. Appln. KOKAI Publication No. 2000-305040 discloses a technique in which a light emitting diode is arranged before a complex prism of the projection type display apparatus, so that color rendering and white balance can be improved. By doing so, red color component, which has not been sufficiently obtained by only discharge lamp, is replenished, so that color rendering can be improved.

However, in general, light is easily diffused in the light emitting diode. For this reason, the conventional lighting device has the following problem that luminance and efficiency are not sufficiently improved in the projection light, which is the final output.

BRIEF SUMMARY OF THE INVENTION

Accordingly, it is an embodiment of the present invention to provide a lighting device, which can improve color rendering and luminance, which cannot be achieved by only using a discharge bulb source, by using a semiconductor light-emitting element such as laser beam source. Another embodiment of the present invention is to provide a projection type display apparatus using the lighting device.

According to an aspect of the present invention, there is provided a lighting device having a plurality of light sources, comprising first means for generating first illuminating light using a discharge bulb, second means, arranged near the first means, for generating second illuminating light using laser beam, and means for overlapping the first illuminating light with the second illuminating light, and emitting the overlapping light.

As described above, the laser beam source having sufficient output and directivity is used as light source overlapping with the discharge bulb. By doing so, red component, which has not been sufficiently obtained by only output of the discharge bulb, is replenished, so that it is possible to provide a lighting device capable of improving color rendering and luminance.

According to an aspect of the present invention, there is provided a projection type display apparatus, having a light valve receiving an illuminating light from a light source and modulating an emitting light in accordance with a video signal, and projecting a video image light emitted from the light valve, comprising an illuminating light source overlapping a first illuminating light from the discharge bulb with a second illuminating light from a laser light source arranged near the discharge bulb by means, and emitting the overlapped light, a light valve receiving light irradiated from the illuminating light, and emitting incident light so as to transmit or reflect it, a drive circuit diving the light valve in accordance with a video signal, and a projection lens projecting a video light emitted from the light valve.

According to an aspect of the present invention, there is provided a projection type display apparatus, having a light valve receiving an illuminating light from a light source and modulating an emitting light in accordance with a video signal, and projecting a video image light emitted from the light valve, comprising an illuminating light source overlapping a first illuminating light from the discharge bulb with a second illuminating light from a laser light source arranged near the discharge bulb by means, and emitting the overlapped light, a light valve receiving light irradiated from the illuminating light; a detection circuit detecting failure when one of the discharge bulb or laser beam source fails, a signal generating circuit generating a message signal in response to the detection result by the detection circuit, a drive circuit diving the light valve in accordance with a video signal and the message signal, and a projection lens projecting a video light emitted from the light valve.

Therefore, it is possible to provide a projection type display apparatus, which can irradiate a projection light having high color rendering and good balance.

BRIEF DESCRIPTION OF THE SEVERAL VIEWS OF THE DRAWING

FIG. 3 is a block diagram showing the circuit configuration of the projection type display apparatus according to the present invention;

DETAILED DESCRIPTION OF THE INVENTION

A lighting device according to the embodiments of the present invention and a projection type display apparatus using the same will be described below with reference to the accompanying drawings.

First Embodiment

Figure 1:
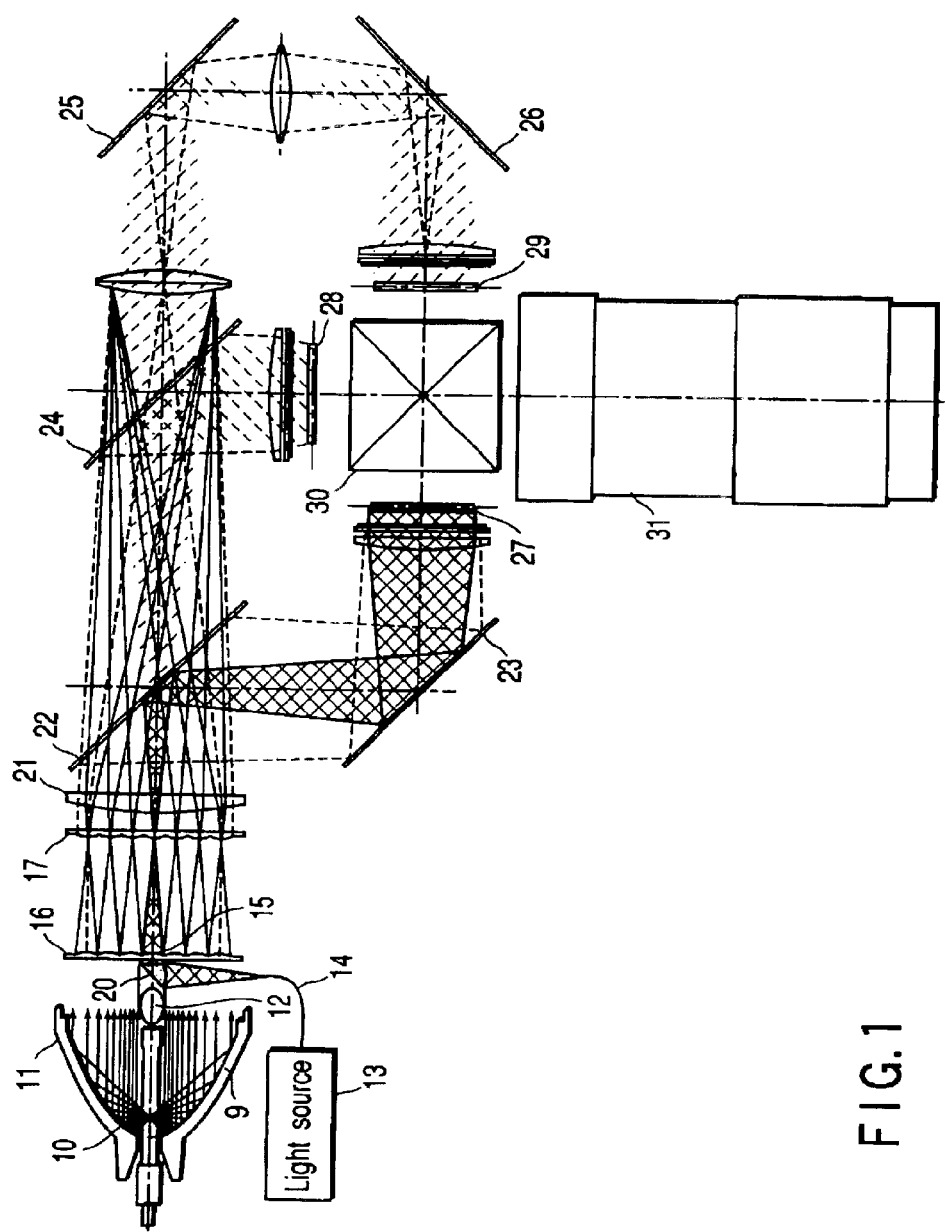
FIG. 1 is a schematic view showing the optical system of a projection type display apparatus using a lighting device according to a first embodiment of the present invention.
Figure 2:
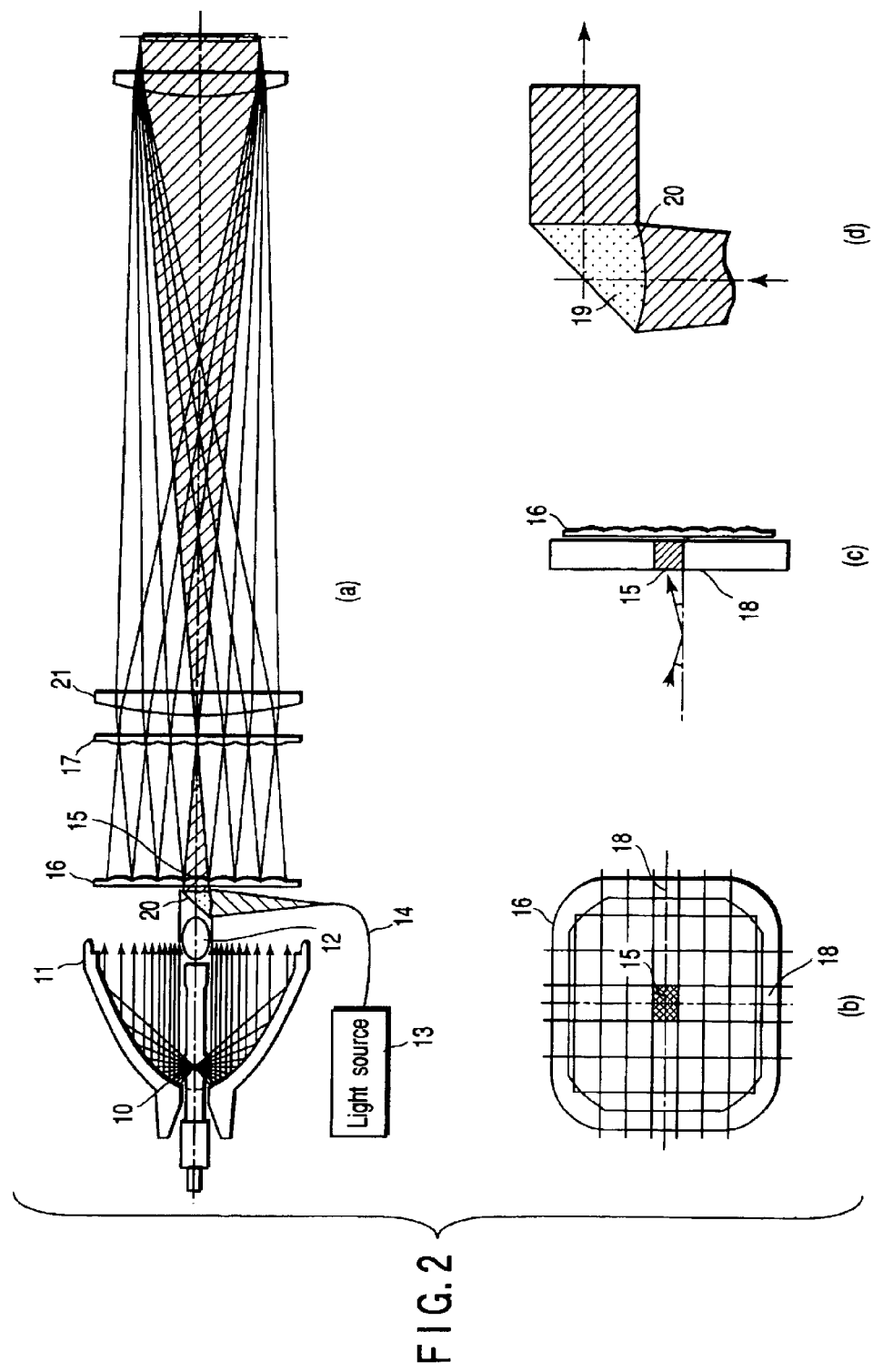
FIG. 2 is a schematic view showing principal parts of the optical system of the projection type display apparatus using the lighting device according to the first embodiment of the present invention.

The first embodiment provides a lighting device having a plurality of light sources and a projection type display apparatus using the lighting device. The lighting device overlaps light from the semiconductor light-emitting element such as laser beam source to the come-off portion on the optical axis of the discharge bulb. FIG. 1 is a schematic view showing the entire configuration of the optical system of a projection type display apparatus using a lighting device according to a first embodiment of the present invention. FIG. 2 is a schematic view showing principal parts of the optical system of the projection type display apparatus. FIG. 3 is a block diagram showing the circuit configuration of the projection type display apparatus.

The projection type display apparatus using the lighting device will be described below with reference to FIG. 1 and FIG. 2. Here, a portion (a) in FIG. 2 is a view showing principal parts of the lighting device. A portion (b) in FIG. 2 is a front view showing a dividing/overlapping lens, and a portion (c) in FIG. 2 is a sectional view showing the same. A portion (d) in FIG. 2 is a sectional view showing a lens prism.

The projection type display apparatus using the lighting device has a discharge bulb 11 comprising an arbitrary-shaped reflecting mirror 9 and an emitting section 10. The arbitrary-shaped reflecting mirror 9 reflects light emitted from the emitting section 10 of the discharge bulb 11 so that the emitted light can be formed into a parallel beam. Short and long wavelength unnecessary lights are absorbed/reflected by a UV filter (not shown) and an IR filter (not shown), and thereafter, removed respectively.

As shown in FIG. 1, a come-off portion 12 on the optical axis is generated in the discharge bulb 11 based on the following structural arrangement, that is, the structure of lamp main body and emitting electrode, reflecting mirror for fixing those, etc. In the first embodiment, light source 13 is provided in order to overlap the illuminating light of the semiconductor light-emitting element, such as laser beam source, using the come-off portion 12. The light source 13 comprises a semiconductor light emitting element, such as a light emitting diode or laser beam source. A center lens 15 of dividing/overlapping lens, that is, a multi-lens 16 is arranged near the optical axis of the come-off portion of the discharge bulb 11.

As illustrated in FIG. 2, a lens prism 20 is further arranged on the light source side. The lens prism 20 includes a lens and a mirror 19. The lens is used for transmitting light emitted from the light source 13, such as laser beam source, via an optical fiber 14 so as to satisfy the NA of the multi-lens 16 (NA: numerical aperture, θ: maximum effective angle, n: refractive index; in this case, NA=n·sin θ). The mirror 19 reflects light reached the optical axis from the periphery to the projection direction.

As described above, in order to overlap the light from the light source 13, which comprises the semiconductor light emitting element with the come-off portion 12 via the optical fiber 14, the lens prism 20 is arranged coaxially with the come-off portion 12. By doing so, it is possible to improve color rendering without deteriorating F-number of the lighting system (F value: effective angle (brightness) index, F no=1/(2NA)). Namely, in the structure of the discharge bulb 11, effective light is very few in the come-off portion 12. For this reason, even if optical overlapping is carried out using the come-off portion, the reduction of optical available efficiency can be kept to the minimum. Therefore, it is possible to build up a projection type display apparatus having a very effective hybrid light source comprising the discharge bulb and the semiconductor light emitting element.

In order to hold the reflecting prism lens 20, which is used for synthesis to the multi-lens 16, a plane holder 18 having high reflectivity is provided at the boundary between fly-eyes. By doing so, it is possible to obtain necessary intensity with the minimum optical loss. This is based on the fact that the plane holder 18 occupies a small area in the optical axis direction, and further, is provided at the boundary between array lenses of the fly-eye irradiating the periphery of the panel.

More specifically, the plane holder 18 has a thickness in the optical axis direction. Further, the plane holder 18 is subjected to high reflecting surface treatment, and is arranged approximately parallel with the optical axis. As such, even if oblique light is incident on the plane holder 18, as shown in a portion (c) in FIG. 2, the light reflected by the plane holder 18 falls within the NA of the multi-lens 16 as optical axis object. However, the coupled optic-axial angle same as pre-reflection is kept so that no optical loss is generated. This is because light other than the multi-lens NA naturally becomes stray light.

The emitted light of the discharge bulb 11 is divided by the multi-lenses 16 and 17, overlapped, and averaged by a condenser lens 21. By doing so, the emitted light is irradiated to transmission type light valves 27, 28 and 29 at approximately uniform quality.

A dichroic mirror 22 is a color separation filter, and reflects an R light (red light) while transmitting GB light (green and blue light). On the other hand, a dichroic mirror 24 reflects the G light (green light) while transmitting the B light (blue light). The R light separated by the dichroic mirrors 22 is reflected by reflecting mirror 23 in order to be incident on light valve 27. The G light separated by the dichroic mirror 24 is incident on light valve 28 while the B light is incident on the light valve 29 via reflecting mirrors 25 and 26. The color light valves 27–29 enable color display. Light valve transmitted light thus obtained is synthesized by a complex prism 30, and projected by a projection lens 31, so that a video image is displayed on the screen (not shown) in accordance with given video information.

A PBS (Polarizing Beam Splitter) and a polarizing axis rotary plate (both not shown) may be used as the light valves 27–29 in place of using polarization of liquid crystal and the like. If the reflecting mirror 9 of the discharge bulb 11 is an elliptic mirror, a rod lens is used in place of the fly-eye lens. It is, therefore, possible to construct a lighting optical system having high efficiency and quality with respect to a micro light valve of about 1-inch.

The electric circuit system of the projection type display apparatus of the present invention will be described in detail with reference to FIG. 3. As seen in FIG. 3, the projection type display apparatus includes a power circuit 41, a microcomputer 46, a lamp drive circuit 43, a video signal processing circuit 44, and a liquid crystal drive circuit 45. The microcomputer 46 functions as a control circuit for controlling the entire operation of the above circuits. The video signal processing circuit 44 is supplied with a video signal from a signal source 51. The liquid crystal drive circuit 45 drives the transmission type light valves 27–29 such as liquid crystal panel.

The power circuit 41 converts an AC (alternating current) voltage from a commercial AC source into a DC (direct current) voltage so as to supply a predetermined DC voltage (+B) to each of the above circuits. (In this case, the DC voltage value supplied to each circuit is simplified in FIG. 3 although it is different.)

The lamp drive circuit 43 lights and drives the discharge bulb 11. The light from the discharge bulb 11 is irradiated to the transmission type light valves 27–29 such as liquid crystal panel. Light source 13 comprising semiconductor light emitting element and optical fiber 14 are provided close to each other. The transmittance of the liquid crystal panels 27–29 changes in accordance with the given video signal, and light irradiated to the liquid crystal panels 27–29 is emitted after being emitted. The emitted video light is projected on a screen (not shown) by the projection lens 31 so that an enlarged video image can be displayed on the screen.

If the projection type display apparatus is a three-panel type, three liquid crystal panels for R (red), G (green) and B (blue) are used. Then, the light from the discharge bulb 11 is separated into R, G and B lights so that the R, G and B lights can be irradiated to the three liquid crystal panels 27–29, respectively. Further, light transmitted through each of the liquid crystal panels 27–29 is synthesized, and thereafter, irradiated to the projection lens 31.

In FIG. 3, the above-mentioned structure is simplified. Therefore, an optical box 50 includes a separating function of separating the light from the discharge bulb 11 into R, G and B lights.

The video signal processing circuit 44 converts the video signal supplied from the signal source 51 into RGB signals, so that the RGB signals can be supplied to the above liquid crystal panels. The microcomputer 46 controls the power circuit 41, lamp drive circuit 43, and video signal processing circuit 44. In this case, the microcomputer 46 controls power on/off and each operation of the circuits 43 and 44 in accordance with the instruction from a remote controller (not shown) by user's operation.

As will be appreciated from the above description, according to the first embodiment of the present invention, it is possible to provide a projection type display apparatus having high luminance and high contrast. That is, the projection type display apparatus overlaps the illuminating light from the semiconductor light emitting element, such as laser light source, is overlapped using the optical axis area having no effective light in nature. As such, the projection type display apparatus can improve color rendering, which has not been sufficiently obtained using only discharge bulb.

The above semiconductor light-emitting element does not necessarily have to be a laser beam source, and light source comprising other semiconductor light emitting elements such as light emitting diode may be used. In this case, the same operation and effect can be obtained. For example, if the light emitting diode is used, directivity is secured by optical fiber, and thereby, sufficient luminance overlapping is performed, so that color rendering can be improved.

Second Embodiment

Figure 4:
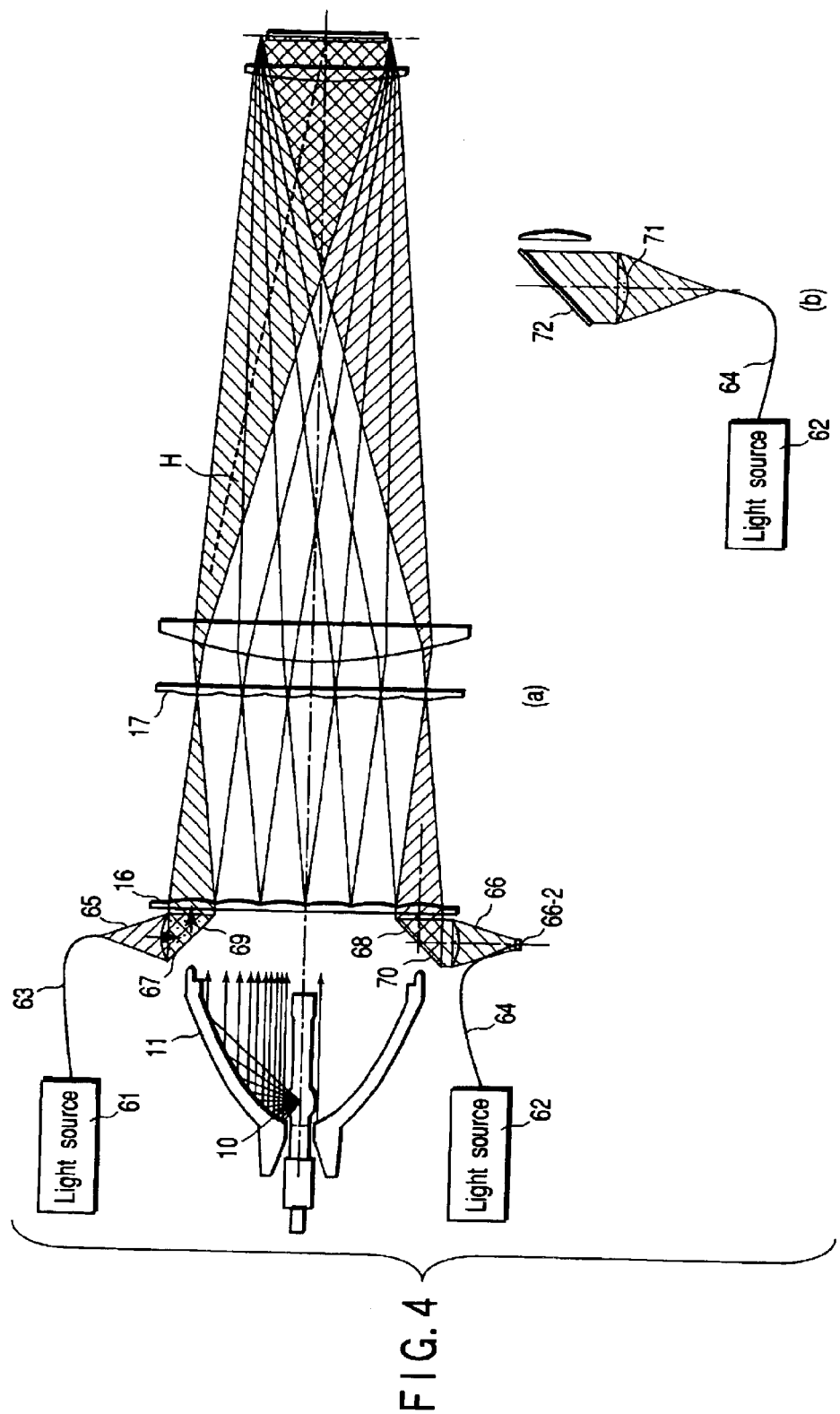
FIG. 4 is a schematic view showing the optical system of a projection type display apparatus using a lighting device according to a second embodiment of the present invention.
Figure 5:
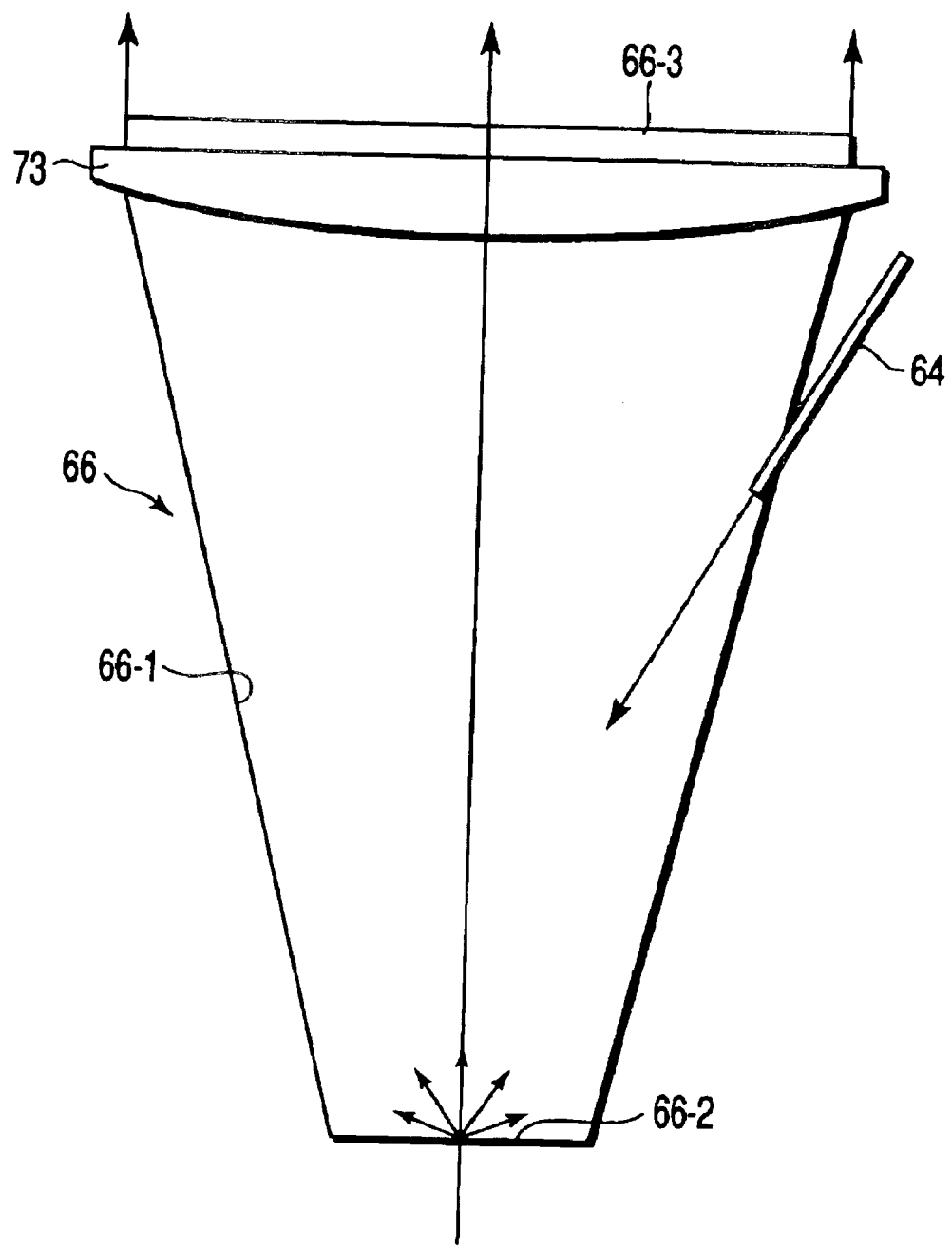
FIG. 5 is a schematic view showing a kaleidoscope used in the embodiments of the lighting device of the present invention.
Figure 6:
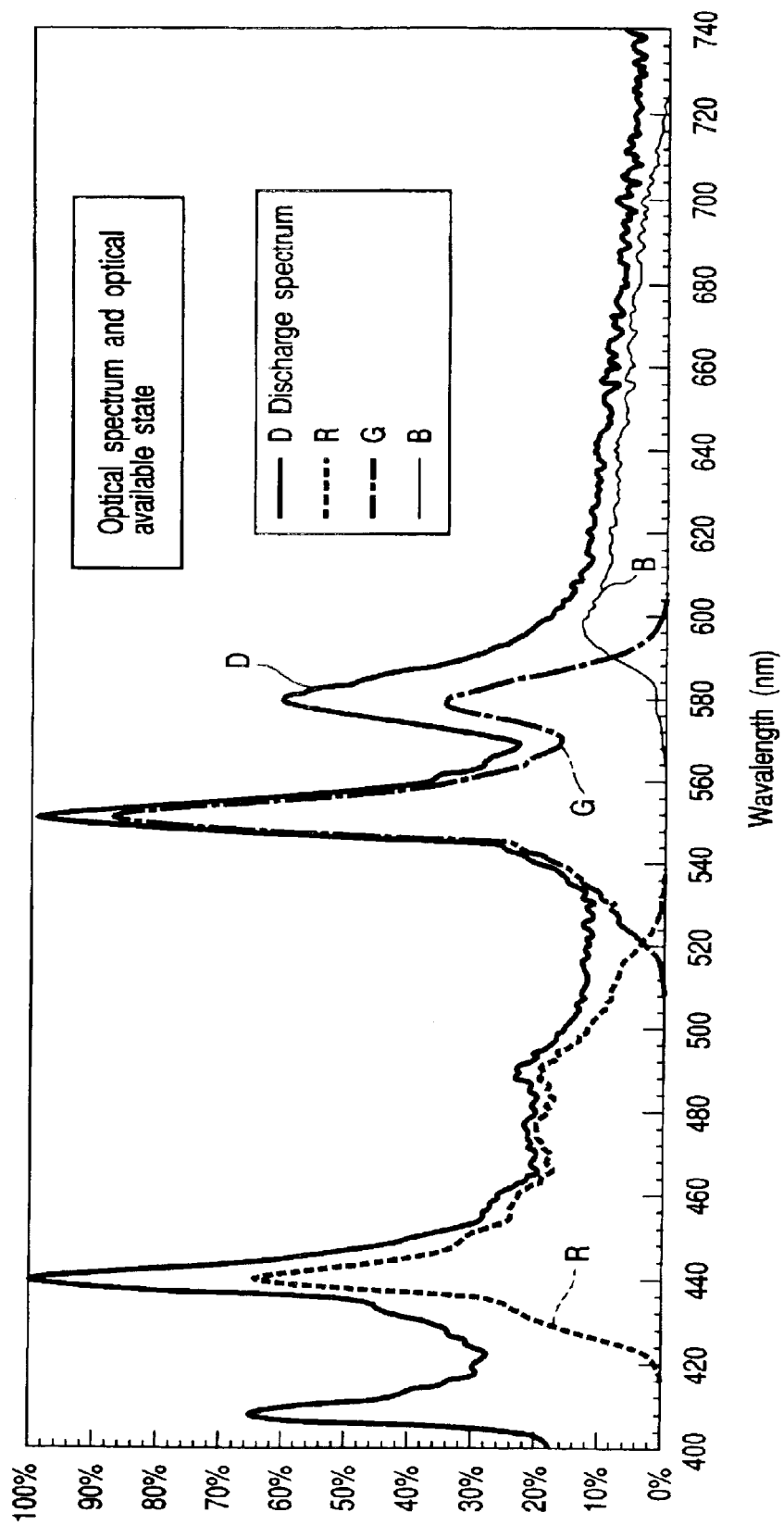
FIG. 6 is a graph showing the available state of each spectrum of discharge tube light source and general optical primaries in order to explain a third embodiment of the present invention.
Figure 7:
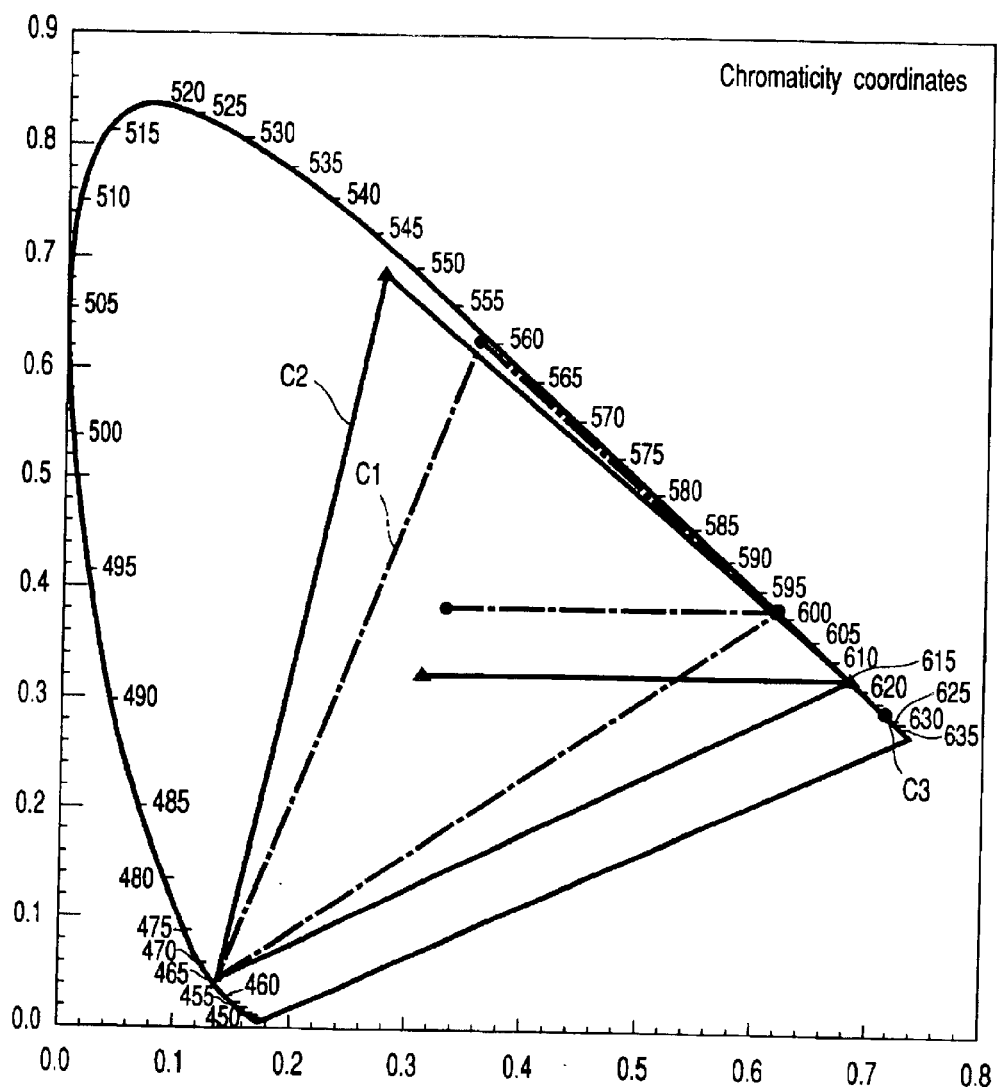
FIG. 7 is a chromaticity diagram showing color rendering of the light source according to the present invention in order to explain the third embodiment of the present invention.
Figure 8:
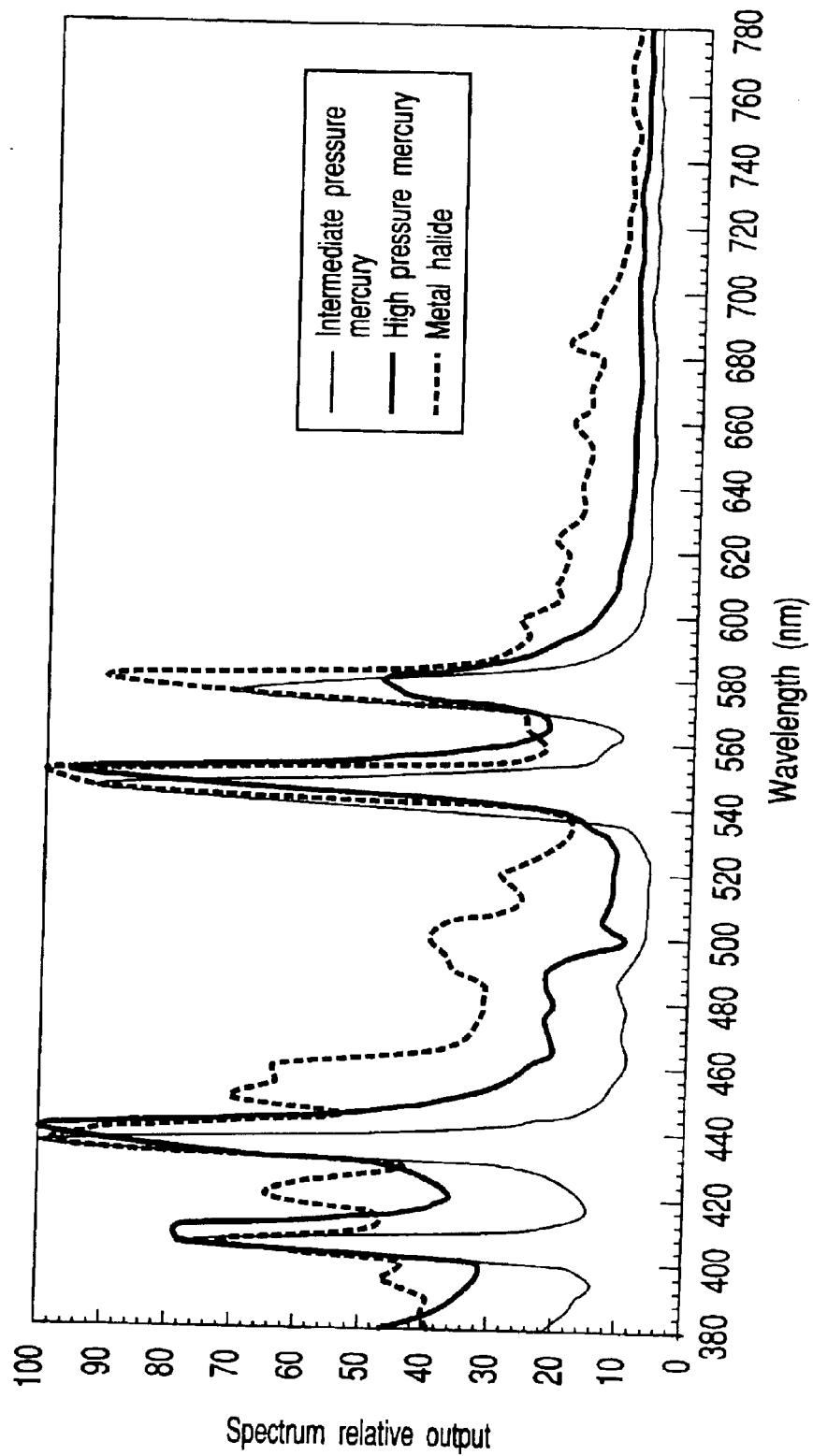
FIG. 8 is a graph showing the characteristics of a discharge lamp for conventional projection type display apparatus.

The second embodiment provides a lighting device having a plurality of light sources and a projection type display apparatus using the same. Illuminating light from semiconductor light emitting element such as laser beam source is overlapped at the outermost peripheral portion of the discharge bulb. FIG. 4 is a schematic view showing the optical system of a projection type display apparatus using a lighting device according to a second embodiment of the present invention. FIG. 5 is a schematic view showing a kaleidoscope used in the embodiments of the lighting device of the present invention. FIG. 6 is a graph used to explain a second embodiment of the present invention, and shows the available state of each spectrum of a discharge tube light source of the present invention and general optical primaries. FIG. 7 is a chromaticity diagram showing color rendering of the light source according to the present invention.

The second embodiment is directed to the case where liquid crystal, having an illumination F-number margin, is used as the light valve without using micro lenses. As seen from FIG. 4, the illuminating light from the semiconductor light-emitting element is overlapped at the outermost peripheral portion of the multi-lens where optical available efficiency loss is little.

In FIG. 4, irradiated light from a light source 61, comprising the semiconductor light emitting element such as laser beam source, is guided to an optical overlapping multi-lens structure 16 arranged near the discharge bulb 11 via optical fiber 63. Emitted light 65 is overlapped with irradiated light within the NA of the multi-lens 16 via a mirror plane 69 of a reflecting prism 67 substantially same as the reflecting prism 20 described in FIG. 2.

The irradiated light is irradiated from the light source 61 comprising the semiconductor light-emitting element such as laser beam source, which is a second lighting source parallel with the optical axis. Likewise, irradiated light from a light source 62 comprising the semiconductor light emitting element is overlapped within the NA of the multi-lens structure 16 via a mirror plane 70 of a reflecting prism 68 arranged at the opposite side.

According to the second embodiment, the decentration of principal ray shown by a broken line H of FIG. 4 is generated in accordance with the wavelength of overlapping light. In the optical system using the liquid crystal light valve, which is easy to receive the influences from the field angle so that contrast deterioration readily occurs. In order to overcome this problem, light sources 61, 62, comprising the same semiconductor light-emitting element, are prepared and arranged, so that they can be positioned symmetrically with respect to the optical axis, as depicted in FIG. 4.

In the second embodiment, even if the overlapping device is enlarged in the direction reverse to the optical axis, optical available efficiency does not deteriorate. Therefore, so long as there exists allowable space, a condenser lens 71 shown in a portion of (b) in FIG. 4 and a discrete reflecting mirror 72 are arranged in place of the expensive prism having a complicate shape, to achieve the same effect.

Optical overlapping by the multi-lens structure 16 includes dividing and overlapping by each multi-lens. For this reason, if the semiconductor overlapping light illuminated to one multi-lens array to be overlapped is not uniform, the following problem arises. That is, the overlapping light intactly becomes uneven in illumination or color; as a result, the projected image also becomes non-uniform.

In order to solve the above problem, a kaleidoscope structure may be arranged at each emitting portion of the optical fibers 63 and 64. In FIG. 4 shows the example in which a kaleidoscope 66 is arranged at the emitting portion of the optical fibers 64. A diffuser 66-2 converts light guided from the light source 62, which comprises semiconductor light emitting element, via the optical fiber 64 into diffused light. Then, kaleidoscope 66 converts the diffused light into uniform and high quality overlapping light (source) within the multi-lens NA range. As such, it is possible to provide a projection type display apparatus including further desirable lighting device.

Description of Kaleidoscope

FIG. 5 shows the basic principle of kaleidoscope 66. The structure of the kaleidoscope 66 has been already disclosed in Jpn. Pat. Appln. KOKAI Publication No. 2000-259541 filed by the present applicant; therefore, the details are omitted. The outline of the structure is as shown in FIG. 5.

More specifically, the kaleidoscope 66 comprises a pyramid-shaped main body 66-1, a diffuse-reflecting plane 66-2, and an irradiating plane 66-3, as seen from FIG. 5. The pyramid-shaped main body 66-1 has a mirror-finished inner plane. The diffuse-reflecting plane 66-2 is provided at the small-diametrical end portion of the main body 66-1, and the irradiating plane 66-3 is provided at the large-diametrical end portion thereof.

The light from the optical fiber 64 is irradiated to the diffuse-reflecting plane 66-2. Thereafter, light diffused and reflected by the diffuse-reflecting plane 66-2 is reflected on the inner plane of the main body 66-1, so that light can be emitted from the irradiating plane 66-3. In this case, a lens 73 is provided in order to convert the emitted light into a parallel light.

Third Embodiment

The third embodiment specifies the optimal wavelength as the light source of the lighting device used for the projection type display apparatus when using laser light source as the semiconductor light-emitting element. FIG. 6 is a graph showing the available state of each spectrum of discharge tube light and general optical primaries in order to explain a third embodiment of the present invention. FIG. 7 is a chromaticity diagram showing color rendering of the light source according to the present invention.

In the description of the above embodiments, the semiconductor light-emitting element may comprise a laser beam source or a light emitting diode. However, if the semiconductor light-emitting element is limited to the laser beam source, the wavelengths are selectable. For this reason, it is possible to overlap any one monochromatic light of R, G and B lights, for example. In such a case, it is desirable to use a laser beam source having a specific wavelength in order to achieve optimal color rendering. The following is a description on the specific wavelength for obtaining the optimal color rendering.

Improvement of Color Rendering

The graph of FIG. 6 shows the available state of each spectrum of discharge tube light and general optical primaries, taking the abscissa as wavelength. When representing color rending of the above state by a chromaticity diagram, a locus C1 shown in FIG. 7 is obtained.

In FIG. 7, the outer peripheral surrounded range of the chromaticity diagram is a visual region as color, and numerical values denote wavelength (nm). In the chromaticity diagram, there exist red critical (criticality) (780 nm) at the right side, and when the wavelength gradually becomes short, red (~600 nm), orange, yellow, yellowish green, green (510~540 nm), and cyan, blue (450~480 nm) are plotted. There exist violet critical (380 nm) at the left lower side. A curved line crossing the central portion of the diagram is a black body locus called "white", and expressed numerical values denote color temperature (K).

Considering the values shown in the diagram figure, the following matter can be understood when effectively applying discharge tube spectrum generated from single discharge bulb 11 and removing unnecessary light to the projection type display apparatus. That is, it is inevitably required to take yellow to orange color components close to the wavelength from 560 to 580 nm having a wide range as discharge tube spectrum. In other words, as seen from the locus C1 of FIG. 7, red has an orange narrow color rendering range while green has a yellowish-green narrow color rendering range. Therefore, it can be seen that a projection light has very low color rendering.

Simultaneously, the projection light has the following problem. That is, the NW chromaticity coordinates has low color temperature, and is biased toward green. For this reason, if white on the black body locus is expressed, the green light valve must carry out light limitation of 20% or more even in the white drive stage. Therefore, the contrast ability (dynamic range) as optical light valve deteriorates about 20%. As a result, the projection light has low color rendering, contrast and quality.

Irradiation light from laser beam source is overlapped with the irradiation light (locus C1) generated by the discharge bulb 11. That is, the preceding irradiation light (locus C1) is overlapped with a 635-nm laser beam shown by a locus C3 in the diagram of FIG. 7. The laser beam is equivalent to green-blue light 60% ND, and has 70% power of the red light of the irradiation light from the single discharge bulb. By doing so, the color rendering of the above irradiation light changes from the locus C1 to a locus C2. It can be seen that the above change serves to restore luminance and improves red monochromatic purity.

Wavelength of Laser Beam Source

The overlapping red light source has preferable red chromatic purity so long as it becomes long wavelength. However, both luminosity factor (visual sensibility) and transmittance of each optical element are simultaneously reduced, which is why large power must be inputted. For example, overlapping short-wavelength red light of about 600 nm is with the above irradiation light may improve NW but red chromatic purity may not be improved.

Based upon the above description, the overlapping light wavelength should be selected taking the cost and light emission efficiency of the LD source into consideration. Thus, it is preferable that the laser beam source, which is red light source, has a wavelength of 600 nm or more.

In order to achieve higher picture quality, the wavelength using green light source will be described below. Namely, in order to obtain red monochromatic purity improvement effect of the above locus C2, preferably, the green light source, that is, the laser beam source has a wavelength from 500 to 535 nm so that the green coordinate can be close to N green coordinate.

Even if the above steps are taken, NW shifts to the overlapping wavelength direction because it is desirable to use blue light source in addition to the above red and green light sources. Thus, it is preferable that laser beam source, which is blue light source suitable for being overlapped with the above light sources, has a wavelength from 440 to 490 nm.

The light source having the above wavelengths is simultaneously overlapped, so that it is possible to provide a projection type display apparatus capable of displaying higher quality video image.

Output Limitation of Laser Beam Source

With the light-emitting element used for the present invention is easy to directly obtain a desired light with respect to red light. However, it may not be so easy to obtain optical elements for resonating and emitting green or blue light. Further, the optical element is expensive, and it is difficult to provide the optical element as actual product capable of maintaining emission environment such as temperature control.

Consequently, it may be preferable to use an up-conversion laser light source apparatus capable of obtaining short-wavelength oscillation light in two stages. However, if the above laser light source is applied to the present invention, limitation is made in order to secure safety within human body reaction period (time until human closes his eyelids or turns his eyes from light). In other words, when the projection type display apparatus is a front projection type, the present invention is applicable within a range that the laser beam power of the semiconductor light source satisfies Class-2 laser safety standard. When the projection type display apparatus is a rear projection type display apparatus the present invention is applicable within a range that the laser beam power of the semiconductor light source satisfies Class-1 laser safety standard.

Breakdown Display by Laser Beam Source

If the discharge bulb and the semiconductor light-emitting element such as laser beam source are used together, it will be appreciated that the semiconductor light source has considerably long lifetime of about several million hours as compared with the lifetime (1000 to 8000 hours) of the discharge bulb. For this reason, there is almost no possibility that two light sources break down simultaneously. When one light source becomes defective and produces no light, it may be diagnosed by a light source drive signal monitor means. Thereafter, an error message can be displayed using the remaining light source. This is a function convenient for users.

By way of example, consider the lamp drive circuit 43 of FIG. 3, which detects the change of driving current and thus detects lamp breakdown. According to the control by the microcomputer 46, the video signal processing circuit 44 generates an image signal representing the error message. Then, when the liquid crystal drive circuit 45 drives the liquid crystal panels 27 to 29, the projection light corresponding to the image signal is projected so that the error message can be displayed on the screen (not shown). In this case, the breakdown of the discharge bulb 11 may be displayed using the semiconductor light source 13, or the breakdown of the semiconductor light source 13 may be displayed using the irradiation light of the discharge bulb 11.

Fourth Embodiment

Figure 9:
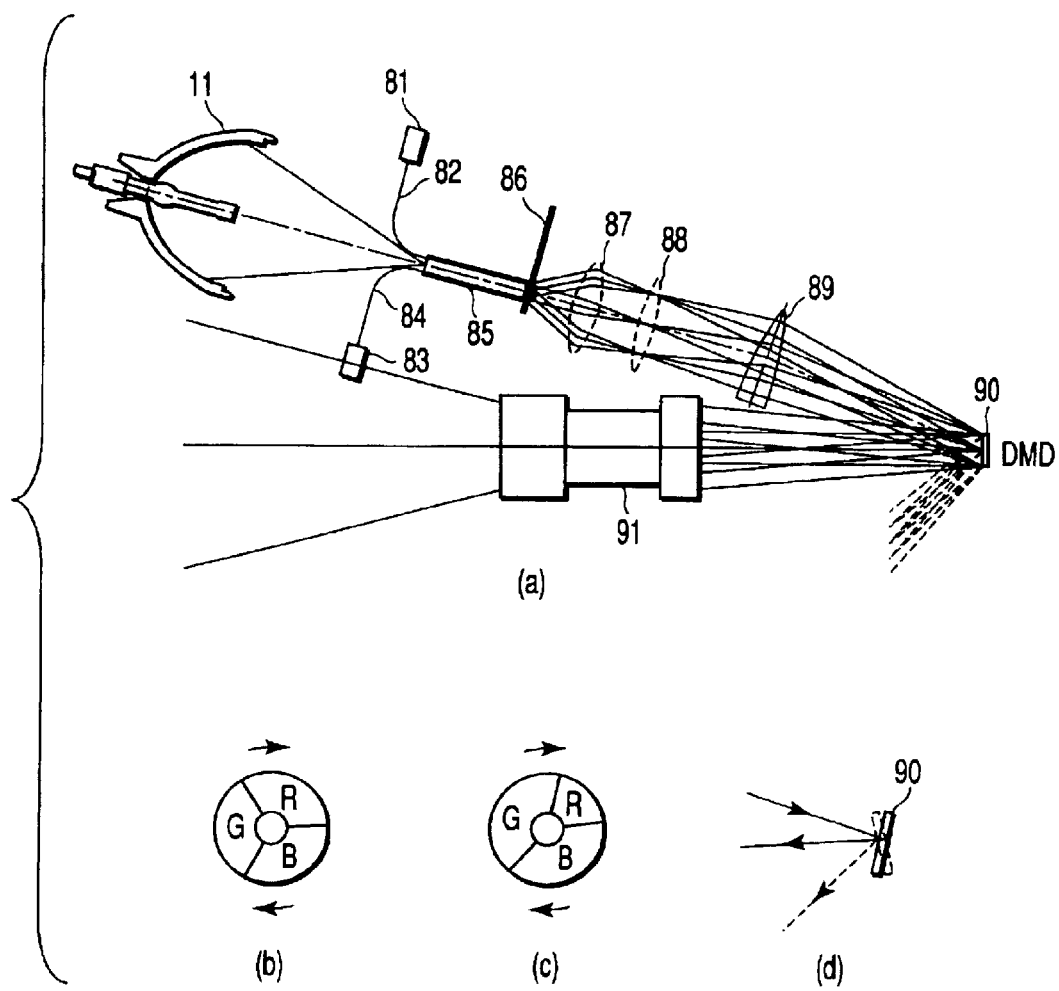
FIG. 9 is a schematic view showing the optical system of the projection type display apparatus using a DMD, which is a fourth embodiment of the lighting device according to the present invention.
Figure 10:
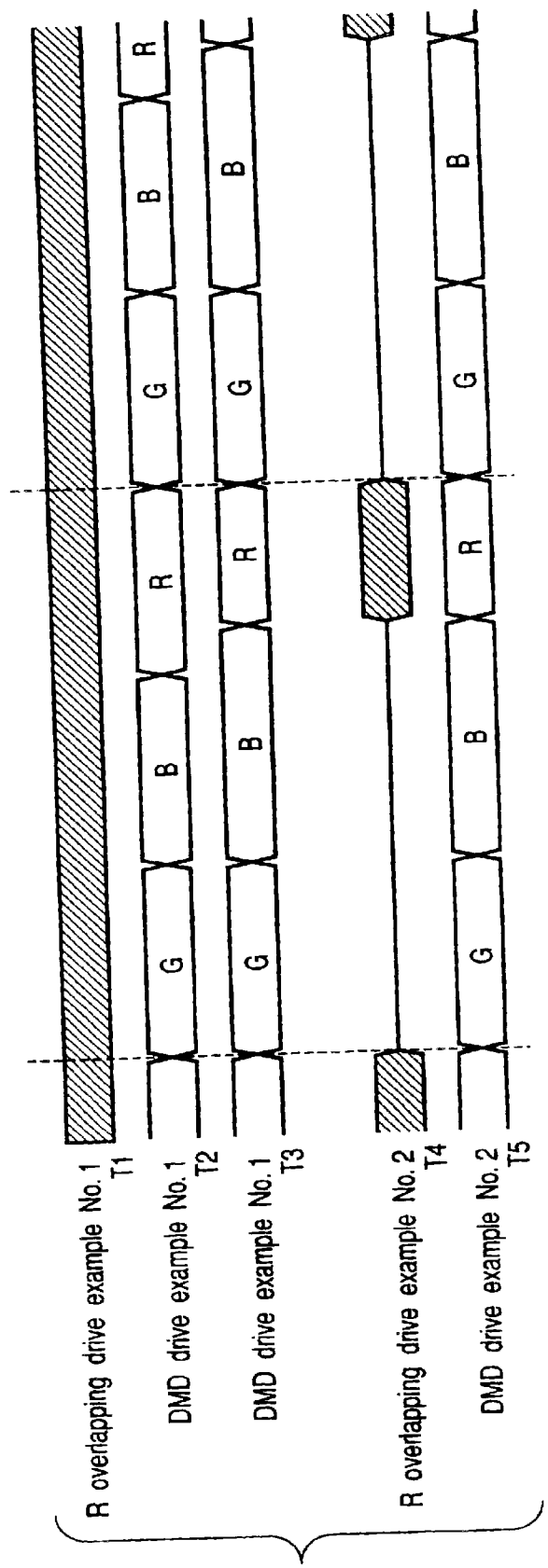
FIG. 10 is a timing chart to explain the operation of the light device according to the fourth embodiment of the present invention.

The fourth embodiment describes a projection type display apparatus using a DMD (Digital Micro Mirror Device) system as a space modulation light valve. FIG. 9 is a schematic view showing the optical system of the projection type display apparatus using the DMD of the fourth embodiment. FIG. 10 is a timing chart to explain the operation of the fourth embodiment.

In the projection type display apparatus using the DMD shown in FIG. 9, irradiation light from the discharge bulb 11 is irradiated to a color wheel 86 via a kaleidoscope 85. The color wheel 86 is rotated at 60 frames per second. The irradiation light passed through the color wheel 86 passes through a condenser lens 87 and relay lenses 88 and 89, and projected onto a DMD chip 90.

The DMD chip 90 is a very small mirror element assembly, and includes a micro-mirror array. Each mirror element is supported by hinge structure, and the micromirror is movable around the hinge. As illustrated in a portion (d) in FIG. 9, the DMD chip 90 is tilted to an on state (solid line) or off state (broken line).

In the on state, light incident on the mirror is reflected to a projection lens 91. In the off state, the light is reflected to the direction different from the projection lens 91. Namely, it is possible to modulate light incident on the surface of the mirror depending upon the on or off state of the mirror tilt angle.

Reflecting light from the mirror passes through the projection lens 91 so that image can be displayed on the screen. If the mirror is in an on state for a long time, the video image on the screen becomes bright; on the other hand, in the off state, it becomes dark. Therefore, the turning on and turning off of the mirror is controlled in accordance with the video signal level, and thereby, the video image can be displayed on the screen.

The color wheel 86 is divided into R. G and B sectors, as seen from a portion (b) in FIG. 9 and a portion (c) in FIG. 9. The color wheel 86 is rotated at a predetermined rotational speed, and thereby, R, G and B lights are successively irradiated to the DMD. The DMD is driven based on an irradiation timing in accordance with R, G and B video signals so that color display can be achieved. As described above, one optical system is divided into R, G and B in time division, so that color display can be achieved by the small-scale optical system.

According to the present invention, light sources 81 and 83 comprising semiconductor light-emitting element are arranged with respect to the projection type display apparatus using the above DMD system, together with optical fibers 82 and 84. Irradiation light from the optical fibers 82 and 84 is irradiated to the kaleidoscope 85.

FIG. 10 shows emission timing of the light sources 81 and 83 comprising semiconductor light-emitting element and drive timing of the DMD 90. In the timing T1 case, light sources 81 and 83 comprising semiconductor light-emitting element continue to emit light. In accordance with the timing T1, the DMD 90 alternately changes at the timing T2 equally divided into R, G and B. In this case, the color wheel 86 has equally divided three regions shown in a portion (b) in FIG. 9.

The following is a description on the case where each of R, G and B periods is not equal, and the DMD 90 changes at the timing T3 for setting the period R short. In this case, the color wheel 86 has narrow R region as seen from a portion (c) in FIG. 9.

The following is a description on the timing T4 case where the light sources 81 and 83 comprising semiconductor light-emitting element emits light synchronously with the operational timing of the corresponding color light source of three primaries of the DMD 90. In this case, the light sources 81 and 83 comprising semiconductor light-emitting element are red light source, and is synchronized with the R timing T5 of the DMD. At that time, the color wheel 86 has narrow R region shown in a portion (c) in FIG. 9, as described above. However, the emission of the light sources 81 and 83 may be synchronized with the specific color of the color wheel 86 at the timing T2 equally divided into three.

As described above, according to the fourth embodiment of the present invention, overlapping of the light source comprising semiconductor light-emitting element is applied to the projection type display apparatus using the DMD system. In particular, the emission timing of the light source comprising semiconductor light-emitting element is synchronized with the operation of the color wheel. By doing so, wasteful emission is prevented, power consumption is reduced, and improved color rendering is achieved. As such, it is possible to provide an efficient projection type display apparatus.

It is obvious for skilled persons to realize the present invention based on the various embodiments described above, and to readily image various modification examples of these embodiments, and further, to apply this invention to various embodiments even if there is no inventive ability. Accordingly, the present invention may be made without departing from the spirit or scope of the principle and novel features as defined by the appended claims and their equivalents, and is not limited to the above embodiments. Thus, the preceding detailed description is not meant or intended to, in any way, limit the invention—rather the scope of the invention is defined by the appended claims.

What is claimed is:

1. A lighting device having a plurality of light sources, comprising:

first means for generating first illuminating light using a discharge bulb;

second means, arranged near the first means, for generating second illuminating light using laser beam; and means for overlapping the first illuminating light with the second illuminating light, and emitting the overlapping light, wherein the overlapping means comprises:

a reflecting prism arranged at an outer peripheral portion of the discharge bulb, receives the second illuminating light from the second means, and coaxially emits it to the emitting direction of the first illuminating light, and a kaleidoscope for receiving the second illuminating light from the second means, and guiding it to the reflecting prism.

2. A projection type display apparatus, having a light valve receiving an illuminating light from a light source and modulating an emitting light in accordance with a video signal, and projecting a video image light emitted from the light valve, said projection type display apparatus comprising:

an illuminating light source that overlaps a first illuminating light from the discharge bulb with a second illuminating light from a laser light source arranged near the discharge bulb by overlapping means, and emitting the overlapped light;

a light valve that receives light irradiated from the illuminating light, and that emits incident light so as to transmit or reflect it;

a drive circuit that drives the light valve in accordance with a video signal, and a projection lens that projects a video light emitted from the light valve, wherein the overlapping means of the illuminating light source comprises:

a reflecting prism, arranged at an outer peripheral portion of the discharge bulb, that receives the second illuminating light from the laser beam source and coaxially emits it to the emitting direction of the first illuminating light, and a kaleidoscope that receives the second illuminating light from the laser beam source and guides it to the reflecting prism.

* * * * *